Patented July 3, 1945

2,379,420

UNITED STATES PATENT OFFICE 2,379,420

PREPARATION OF TOCOPHEROLS

James G. Baxter and Charles D. Robeson, Rochester, N. Y., assignors to Distillation Products, Inc., Rochester, N. Y., a corporation of Delaware No Drawing. Application May 8, 1941,
Serial No. 392,490

6 Claims. (Cl. 260—333)

This invention relates to a method for purifying and/or separating the different forms of tocopherol.

There are three tocopherols which are useful for their vitamin E activity and also as antioxidants. Most sources of tocopherols such as wheat germ, cotton seed, and oil refinery wastes such as the hot well scum of a steam deodorizer, contain more than one tocopherol. Since the stability, antioxidant potency, and biological activity of the tocopherols are different, it is frequently desirable to separate and purify them from their mixtures. Also, considerable difficulty has heretofore been encountered in connection with the concentration of tocopherols.

This invention has for its object to overcome the above difficulties. Another object is to provide a relatively efficient method for separating the different tocopherols from mixtures. A further object is to provide improved procedure for preparing highly concentrated tocopherol preparations. Another object is to improve the state of the art. Other objects will become apparent from the following description and claims.

These and other objects are accomplished in accordance with our invention which includes passage of a solution of the mixed tocopherols to be separated in a non-eluting solvent through a body of adsorbent and then eluting with appropriate solvents. We have discovered that the tocopherols are not retained by the adsorbent with the same degree of tenacity and that the tocopherols can be, to a substantial extent, individually removed from the adsorbent by elution with appropriate solvents.

In the following description we have given several of the preferred embodiments of our invention. However, it is to be understood that these are set forth for the purpose of illustration and not in limitation thereof.

As satisfactory adsorbents may be mentioned the clays, activated or not, such as "Special Filtrol" or "Super Filtrol" and kaolin; silica gel; "Doucil" (a sodium aluminum silicate used for water softening), and aluminum, calcium and magnesium oxides. We prefer the weak adsorbing agents to strong agents. However, agents such as aluminum, calcium and magnesium oxide, are satisfactory especially if inactive or deactivated forms thereof are used. The use of active or strong adsorbing agents is mainly desirable in connection with the treatment of relatively dilute tocopherol-containing mixtures such as crude vegetable oils. It is best not to use strong alkaline adsorbents since alkali tends to partially destroy tocopherols. We prefer to use a non-alkaline adsorbent.

The tocopherol mixture to be treated is first dissolved in a non-eluting solvent or in a solvent having substantially no eluting action. Non-polar organic liquids are in general satisfactory for this purpose. The ones which we have found to be most satisfactory are petroleum ether, "Skellysolve," and ligroin. Non-polar chlorinated hydrocarbons such as carbon tetrachloride can be used.

The material from which the tocopherols are to be separated may be concentrated or not. A very satisfactory material is one produced by molecular distillation of a steam deodorizer scum such as mentioned above, or of a tocopherol-containing oil such as wheat germ, corn, cotton seed oils, etc. However, partial concentrates thereof may be treated. Also, distillates which have been treated to further concentrate their tocopherol content are quite satisfactory. Saponification concentrates produced in the well-known manner can be treated in accordance with our invention. When the procedure is applied to a dilute source, precautions must be taken to avoid elution of the tocopherols by the large amount of impurities present. As mentioned above, glycerides act as eluting agents and this action may be prevented, preferably by utilizing a strong adsorbent. In such a case, relatively strong eluting solvents may be necessary.

The tocopherol material is preferably dissolved in the non-eluting solvent to form a rather highly concentrated tocopherol solution. When concentrates are treated it is best to use a solution of about 5 to 60% of the concentrate in the non-eluting solvent. However, larger or smaller proportions can be used with satisfaction, the only problem being the recovery of large amounts of solvent where very dilute solutions are utilized. It has been customary heretofore (see Drummond, "Biochemical Journal," 1938, pages 1953–6), to adsorb tocopherols from very dilute solutions. Although our invention can be applied to such dilute solutions, it will be realized that this procedure is not satisfactory from a commercial standpoint since the amount of vitamin E recovered, separated or concentrated is very minute compared with the amount of solvent which must be used and recovered. As a general proposition, tocopherol concentrations in any one eluting solvent of from .05 to 50% should be treated. Tocopherol concentrations of 1 to 20% will be found to be most useful.

The solution of tocopherol in non-eluting solvent is then passed through the body of the adsorbent. A satisfactory method of doing this is to pack the adsorbent in a container having an opening at the top and bottom. The solution is poured in at the top and the residual solvent is removed at the bottom. It is desirable that the top and bottom be closed so as to avoid excessive contact with air during the procedure. A quite satisfactory method of contact is to fill a pipe or a conduit having about a 3" diameter and height of 10" with the adsorbent. The top of the conduit is closed with a plate through which an introduction conduit or pipe protrudes. The base is likewise closed by a plate connected with a withdrawal conduit. The solution is introduced at the top, passes through the column and residual solvent is withdrawn at the base.

Before introducing the solution of tocopherols it is best to saturate the column with a portion of the non-eluting solvent in which the tocopherols are dissolved. Reasonable precautions should be taken to avoid contact with air. This can be accomplished by first passing nitrogen through the column and also forcing the solution through the column by means of nitrogen under pressure. Other inert gases can be used. The solution is preferably passed through the column until it has become saturated with tocopherols. This is indicated by the presence of tocopherol in the solvent after passage through the adsorbent. However, this constitutes the preferred procedure and separation can be accomplished by incomplete saturation of the column if desired.

The body of adsorbent is then treated with a non-eluting or weak eluting solvent; i. e., one which will not elute all of the tocopherol present. In this way that form of tocopherol which is most weakly adsorbed on the column is first removed and can be separated and recovered. We have found that alpha tocopherol is thus removed by using the non-polar solvents which were used to pass the solution through the column; i. e., petroleum ether, "Skellysolve," ligroin and the like. Therefore, we may wash the column with such a material until the removal of tocopherol has substantially ceased or decreased. The other forms of tocopherol are then removed from the column by washing successively with somewhat stronger eluting agents such as benzene, toluene, xylene ether, acetone, alcohol or mixtures thereof.

It may be stated that as a general rule the stronger the adsorbent the stronger must be the eluting solvent. In other words, the degree of activity of the adsorbent varies with the activity of the eluting agent. For this reason the determination of appropriate solvents to use is necessary in connection with each particular adsorbent, or class of adsorbents. With strong adsorbents it will be necessary to use stronger eluting agents or mixtures thereof. The solution of tocopherol in eluting solvent may be treated in any desired manner to recover or utilize the tocopherol contained therein. The best method is to remove the solvent by distillation preferably under vacuum.

We have found that the concentration of a tocopherol is also greatly increased by this procedure. For instance, a tocopherol concentrate can be dissolved in a non-eluting solvent to form a solution of tocopherol of relatively high potency such as 1 to 20%. After passage through the adsorbing column and removal by elution, it will be found that the tocopherol potency has been markedly increased. The feature of utilizing high concentrations of the tocopherol in the eluting solvent is important if simultaneous concentration is desired. We include this procedure within the scope of our invention. This concentration feature in and of itself is quite different from the adsorption procedure heretofore utilized wherein minute amounts of tocopherol were contacted with the adsorbent and the column then broken up into separate zones and the zones treated to remove the minute amount of tocopherol therefrom. This prior procedure was entirely unsatisfactory for commercial operations because of the very small capacity and because the breaking up of the column was expensive and caused oxidation of the tocopherol.

*Example*

A large adsorption column was packed with 2000 g. "Doucil" and 4500 cc. petroleum ether was added to wet the column. Then 300 g. of distilled concentrate (46% tocopherol) in 1200 cc. petroleum ether was filtered through the adsorbent under slight nitrogen gas pressure. A preliminary assay showed the tocopherols in the concentrate to consist of 50% alpha and 50% gamma tocopherols.

The column was next washed with 9 liters of petroleum ether followed by 9 liters of benzene. During the experiment the filtrate from the column was collected in 1 liter fractions. After evaporation of an aliquot portion from each fraction the composition of the tocopherol in it was determined. The analysis showed that the petroleum ether fractions contained substantially all the alpha tocopherol, the benzene fractions most of the gamma tocopherol. There was, of course, some overlapping so that intermediate fractions containing both alpha and gamma were obtained. The fractionation was sufficiently sharp, however, that these might be discarded without too marked a loss of tocopherol.

In the following table is shown the data from an analysis of the combined petroleum ether fractions (fraction 1) and the combined benzene fractions (fraction 2).

*Table I*

| Fraction | Wash solvent | Weight of fraction | Per cent mixed tocopherols | In the mixed tocopherols | |
|---|---|---|---|---|---|
| | | | | Percent alpha | Per cent gamma |
| | | Grams | | | |
| 1 | Skellysolve | 206 | 36.0 | 88 | 12 |
| 2 | Benzene | 74 | 89.0 | 15 | 85 |
| | Original oil | 300 | 46.0 | 50 | 50 |

The recovery of tocopherol was 100% in this experiment; the usual recovery lies between 85 and 95%.

It is to be understood that the terms weak eluting solvent and strong eluting solvent or like terms have the meaning usually accorded them in the art of chromatographic adsorption, i. e., weak eluting solvents are those which in general exhibit weak eluting powers; strong eluting solvents are those which in general exhibit strong eluting powers.

What we claim is:

1. The process of substantially separating one of the tocopherols from a mixture of free tocopherols which comprises dissolving the mixture in a solvent having relatively weak eluting action, passing this solution through a body of an adsorbent whereby the tocopherols are substantially adsorbed thereon, eluting the unbroken adsorbent body with a relatively weak eluting solvent which will remove substantially only one of the tocopherols until most of one of the tocopherols has been removed with at most minor amounts of the other form of tocopherol and then eluting the unbroken adsorbent body with an eluting solvent having stronger eluting powers than the solvent first used.

2. The process of substantially separating one of the tocopherols from a mixture of free tocopherols, which comprises dissolving the mixture in a solvent which has little eluting action, passing this solution through a body of an adsorbent selected from the group consisting of silica gel, activated clays, non-activated clays, and aluminum silicates, eluting the unbroken adsorbent body with a weak eluting solvent until one of the tocopherols has been removed without removing more than minor amounts of other forms of tocopherol and then eluting the unbroken adsorbent body with an eluting solvent having stronger eluting powers than the solvent first used until another form of tocopherol has been substantially removed.

3. The process of substantially separating one of the tocopherols from a mixture of at least two tocopherols in free form one of which is alpha which comprises dissolving the mixture in a solvent which has little eluting action, passing this solution through a body of an adsorbent whereby the tocopherols are substantially adsorbed thereon, eluting the unbroken adsorbent body with a relatively weak eluting solvent whereby there is a preferential removal of alpha tocopherol and then eluting the unbroken adsorbent body with a different solvent having a stronger eluting action whereby there is a preferential removal of a different tocopherol.

4. The process of substantially separating the tocopherols from a mixture of free alpha and gamma tocopherol which comprises dissolving the mixture in a solvent which has relatively weak eluting action, passing this solution through a body of a relatively weak adsorbent whereby the tocopherols are substantially adsorbed thereon, treating the unbroken adsorbent body with a relatively weak eluting solvent until the alpha tocopherol has been substantially removed, and then treating the unbroken adsorbent body with a relatively stronger eluting solvent until the gamma tocopherol has been substantially removed.

5. The process of substantially separating one of the tocopherols from a mixture of free alpha and beta tocopherol which comprises dissolving the mixture in a solvent which has relatively weak eluting action, passing this solution through a body of a relatively weak adsorbent whereby the tocopherols are substantially adsorbed thereon, treating the unbroken adsorbent body with a relatively weak eluting solvent until the alpha tocopherol has been substantially removed, and then treating the unbroken adsorbent body with a relatively stronger eluting solvent until the beta tocopherol has been substantially removed.

6. The process of increasing the concentration of a tocopherol preparation which comprises dissolving the preparation which contains the tocopherol in free form to be concentrated in a relatively weak eluting solvent to form a solution containing approximately 1 to 20% tocopherol passing this solution through the body of a weak adsorbent and then eluting the vitamin E from the body of adsorbent with an eluting solvent.

JAMES G. BAXTER.
CHARLES D. ROBESON.